United States Patent Office 3,368,945
Patented Feb. 13, 1968

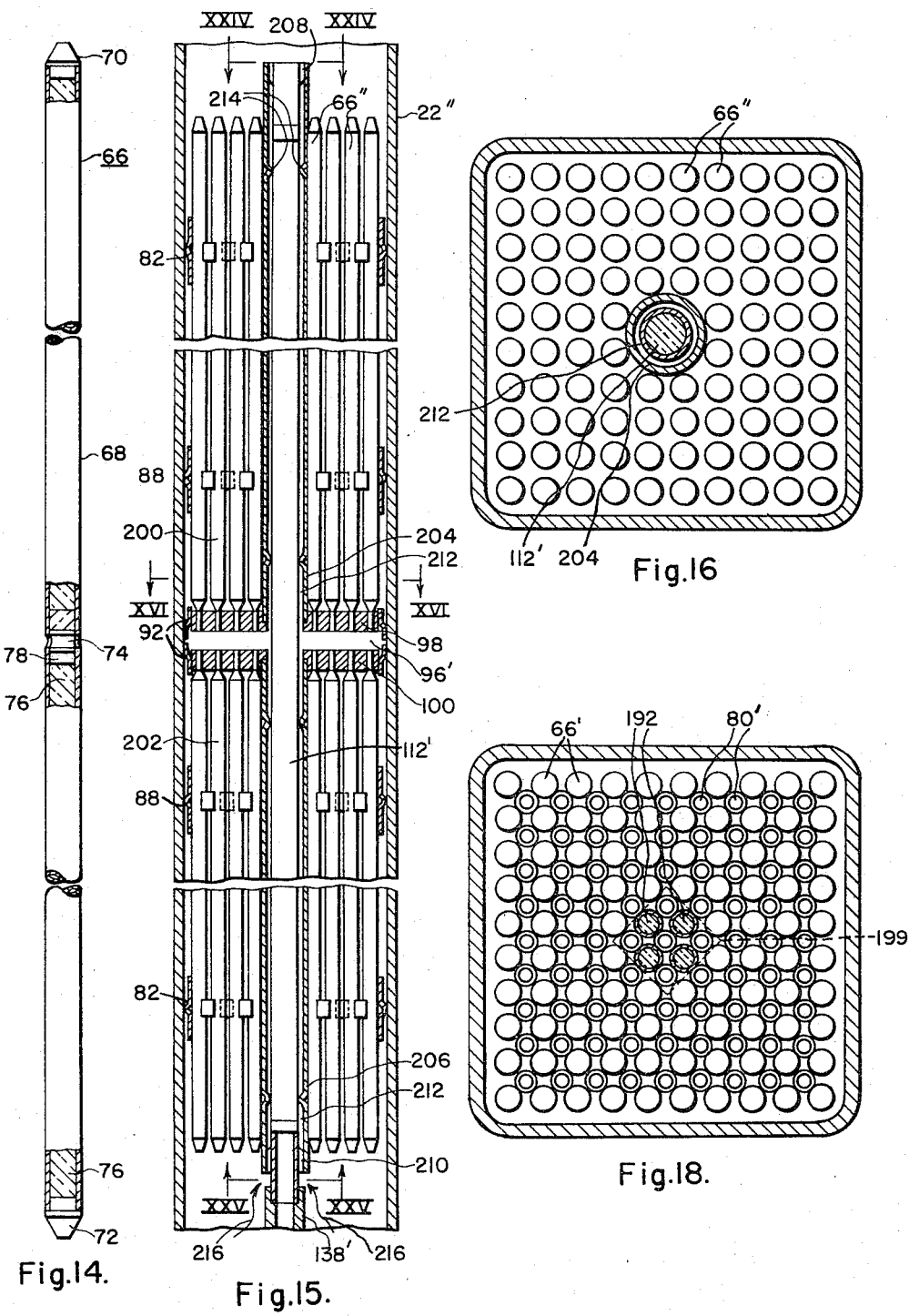

3,368,945
FUEL ASSEMBLY FOR A NEUTRONIC REACTOR
Herbert W. Keller, Penn Hills, and Harry N. Andrews, Pitcairn, Pa., assignors to Westinghouse Electric Corporation, Pittsburgh, Pa., a corporation of Pennsylvania
Filed June 21, 1963, Ser. No. 289,469
19 Claims. (Cl. 176—77)

The present invention relates to a neutronic fuel assembly, and more particularly to an assembly having supporting means incorporated therein for its fuel elements which supporting means are arranged to compensate for bowing and other distortion imparted to the fuel assembly at reactor operating temperatures.

In a neutronic reactor a quantity of a fissionable isotope such as U233, U235, Pu239 or Pu241 is supported within the active region or core of the reactor. A quantity of one or more of the foregoing isotopes is provided such that it will be capable of sustaining a neutronic chain reaction. Desirably, a quantity of a fertile isotope, which is capable of conversion into a fissionable isotope under neutronic bombardment, is supported adjacent to or is commingled with the aforementioned fissionable isotope.

Generically, the aforementioned fissionable and fertile isotopes can be referred to as fissile materials.

The fissile material is provided in a form of a relatively large number of discrete fuel elements and appropriately spaced from one another to permit the passage of a coolant fluid for the purpose of removing the chain-reactional heat from the reactor. A relatively small number of such fuel elements are supported in a unitary fashion as a discrete fuel element assembly, which is in turn, supported by the core structure of the reactor. Since the theoretical thermal output of the chain reacting quantity of fissile material is practically unlimited, the size of the reactor core structure and the number of the aforementioned fuel assemblies is determined by the amount of heat transfer area which is necessary to attain the desired or design thermal output.

The propagational rate of the chain reacting mass, or the reactivity, is controlled usually by a number of neutron-absorbing control members or rods, which are variably inserted into the core structure in order to raise or to lower the free-neutron density of the reactor and thereby to control the number of propagational neutrons. These control rods usually are inserted through closely fitting channels provided between adjacent ones of the aforementioned fuel element assemblies. Various other means of control are also employed such as the use of a burnable poison material such as boron, cadmium or hafnium within the fuel elements or in adjacent structural members of the reactor core or by dissolving or otherwise suspending compounds of such poison materials within the reactor coolant. Also, a built-in means of control is inherently or otherwise provided for controlling the reactor known as the negative temperature coefficient.

The necessarily close spacing of the fuel element assemblies make it imperative to minimize or to prevent altogether any deformation of the assemblies as by bowing or the like under reactor operating conditions. Such bowing would of course interfere with the passage of the aforedescribed control members or rods. Moreover, any resultant bowing of the fuel assemblies would be toward the central axis of the core structure, assuming a symmetric fuel loading, so as to increase the reactivity of the fuel mass in this area. Thus, bowing of the fuel assemblies not only interferes with the passage of control rods therebetween but also introduces a highly undesirable tendency toward a positive temperature coefficient of reactivity. Additionally, bowing of the fuel element assemblies can interfere with the passage of coolant therethrough or therebetween and introduce hot spots which would cause further distortions of the assemblies or perhaps even partial meltdown.

The foregoing problems are magnified to a considerable degree in a fast neutronic reactor, i.e. one in which the chain reaction is propagated by neutrons having speeds in the high energy spectrum. As is well known, a neutronic moderator material is not employed in a fast reactor, inasmuch as most of the fissionable neutrons are in the fast category. Therefore, since slowing of the neutrons is unnecessary (contrary to the case of a thermal or epithermal chain reaction) the individual fuel elements of the reactor core usually are spaced more closely to conserve space and to improve the neutronic economy of the reactor. Accordingly, any distortion of the fuel assemblies (usually evidenced by bowing toward the central axis or hottest part of the reactor core) will have a more pronounced effect of shifting and more closely spacing the fuel elements toward the center of the core, with increase in temperature, to effect a considerable increase in reactivity of this area of a core. This effect results in a positive temperature coefficient; and if some means is not introduced into the core for the purpose of eliminating or compensating this effect, the fast reactor core will be inherently unsafe. Moreover, the more restricted fluid passages in a fast reactor core renders the core structure much less tolerant of distortions which will tend to restrict these passages, for the reasons mentioned above.

Furthermore, bowing is intolerable in most thermal and epithermal reactors for some or all of the foregoing reasons. Also, certain of the latter classes of reactor designs have been found to exhibit a net positive coefficient of reactivity.

In view of the foregoing, it is an object of the invention to provide a novel and more efficient fuel element assembly.

Another object of the invention is the provision of a neutronic fuel assembly having means incorporated therein for minimizing the tendency of the fuel elements within the assembly to bow or otherwise to distort at high temperatures and for compensating for any resultant distortion that otherwise occurs.

A further object of the invention is the provision of a neutronic fuel assembly having a supporting structure incorporated therein for the fuel elements which structure will permit bowing of the fuel elements at reactor operating temperatures in a direction which at least will effect no net displacement of the fuel elements toward the central region or the hottest part of the reactor core. More specifically, it is an object of the invention to provide a fuel assembly of the character described wherein the supporting structure of the individual fuel elements will induce a net displacement of the fuel elements, when there is a tendency to bow, away from the central region or hottest part of the reactor core structure.

Still another object of the invention is to provide a neutronic fuel element assembly having novel means for resiliently mounting the fuel elements therewithin so that any bowing of the latter is not directly transmitted to the supporting structure of the assembly, so that little or no bowing is imparted to the external surfaces of the assembly.

Another object of the invention is the provision of a fuel element assembly having novel means for supporting two or more groups of closely spaced fuel elements therewithin.

A still further object of the invention is the provision of a fuel element assembly of elongated structure and having blanket portions of fertile isotopes supported therewithin adjacent each end thereof.

Another object of the invention is the provision of a neutronic fuel assembly particularly adapted for supporting a plurality of rod type fuel elements in a closely spaced array.

Still another object of the invention is the provision of a plurality of such assemblies arranged so as to prevent radiation streaming laterally therefrom.

Another object of the invention is the provision of a rod type fuel assembly having novel means for supporting rod-type blanket or fertile elements in tandem relation adjacent the ends of the fuel elements.

Another object of the invention is the provision of a fuel assembly in accordance with any of the preceding fuel elements and further adapted for use in a fast reactor.

The foregoing objects are accomplished by the invention in the manner described in detail hereinafter with reference to the drawings. Briefly the invention comprises a novel supporting structure for supporting a plurality of fuel elements within a housing or casing of the fuel assembly such that at least one weakened portion, as it were, is provided intermediate the length of the fuel element assembly. The fuel bundle is restrained longitudinally or axially only at one end thereof so that the fuel elements can expand without closing the gap or otherwise distorting the structure constituting the weakened portion by the longitudinal expansion.

However, both ends of the fuel bundle are supported more or less rigidly against lateral movement at locations removed from the aforesaid weakened portion. In areas adjacent the aforesaid weakened portion the fuel elements are supported resiliently against lateral movement so that the elements normally are positioned centrally of the fuel assembly casing. On the other hand, when the assembly is raised to operating temperatures in the reactor core the aforementioned weakened portion and the resilient lateral supports adjacent thereto permit the segments into which the fuel bundle is divided by the aforesaid weakened portion to move away from the central or hottest part of the core structure. This occurs, as explained in detail below, notwithstanding the fact that the fuel element bundles will assume a convex curvature on the side adjacent the hottest part thereof, i.e. adjacent the central portion or hottest part of the core. With this arrangement, the fuel element bundles can be mounted, if desired, so that bowing thereof actually causes a net displacement of fuel material away from the central axis or hottest portion of the core. On the other hand, previous attempts to compensate for the bowing of the fuel elements at best resulted only in minimizing the amount of displacement of the fuel elements toward the central or hottest portion of the core.

The fuel element bundles described heretofore, which are in part rigidly and in part flexibly mounted within the fuel assembly, are also suspended intermediately, in this example, of a pair of spaced blanket or fertile fissile portions of the fuel assembly. In arrangement the aforesaid blanket portions are formed from a plurality of relatively short rods containing fertile material and are less closely spaced than the fuel elements in order to minimize resistance to the flow of fluid through the latter. Each of the blanket bundles of elements are rigidly supported at the respective outer ends and slidably supported along the remaining length thereof to permit differential axial movement of the bundle relative to the fuel assembly housing or casing. As explained hereinafter, any tendency of the blanket or fertile element to bow would tend to displace the entire fuel element containing portion of the casing away from the central or hottest portion of the core to further enhance the inherent negative temperature coefficient introduced into the core structure through use of the fuel elements described herein. As stated previously, the fuel element assemblies disclosed herein can be employed in either a thermal, epithermal or a fast reactor to minimize or to eliminate bowing or distortion, of the fuel assembly and to enhance, in the case of most thermal and epithermal reactors, the inherent negative temperature coefficient of the moderator structures employed in these reactors. However, as pointed out above the fuel element portion of the assembly is especially useful in most fast reactors because of the closer spacings between fuel elements and because it is essential to introduce some structure into the fast reactor core, and into certain thermal reactor cores, in order to counteract or compensate for the inherently positive temperature coefficient introduced by such factors as normal bowing of the fuel elements at reactor operating temperatures.

The foregoing objects, features and advantages of the invention will be made more apparent during the forthcoming description of illustrative embodiments of the invention, particularly when taken in conjunction with the accompanying drawings wherein:

FIG. 14 is an enlarged elevational view, partially in longitudinal section, of a typical fuel rod employed in the fuel assembly of FIG. 1;

FIG. 15 is a partial, longitudinally sectioned view of another form of the fuel assembly arranged in accordance with the teachings herein;

FIG. 16 is an enlarged cross-sectional view of the fuel assembly illustrated in FIG. 15 and taken along reference line XVI—XVI thereof;

FIG. 18 is an enlarged cross-sectional view of the fuel assembly of FIG. 17 and taken along any of the reference lines XVIII—XVIII thereof;

Figure 1:
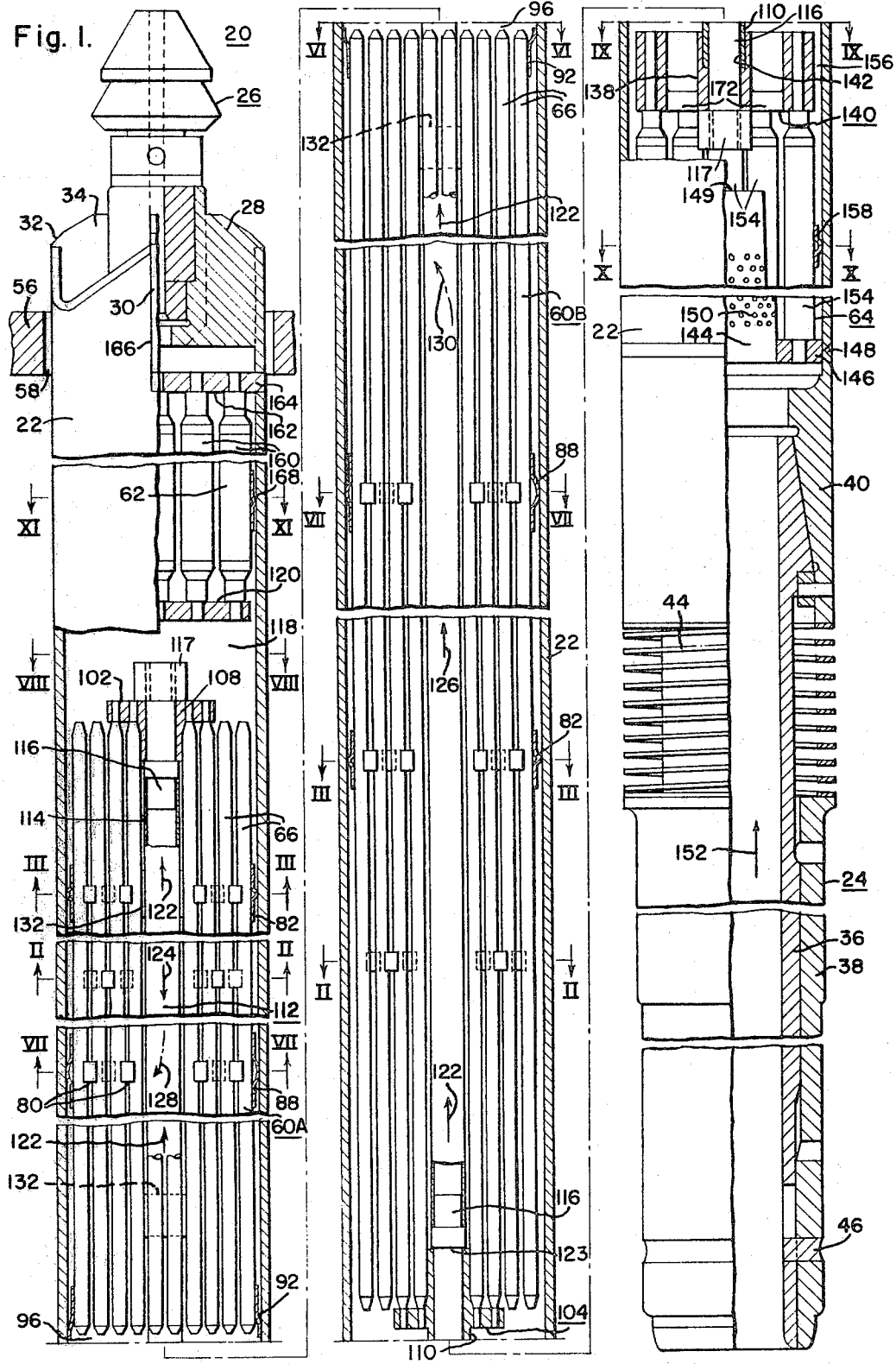
FIGURE 1 is a longitudinally sectioned view of a fuel assembly for a nuclear reactor, which assembly is arranged in accordance with the teachings of the present invention and shows an upper portion of the adjacent core structure of the reactor.
Figure 12:
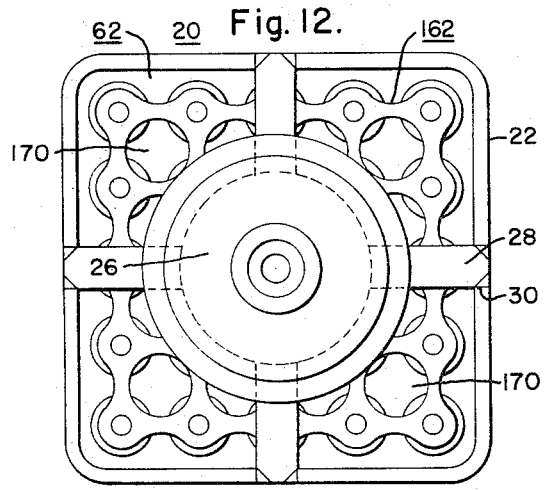
FIG. 12 is an enlarged top end view of the fuel assembly as illustrated in FIG. 1 of the drawings.
Figure 13:
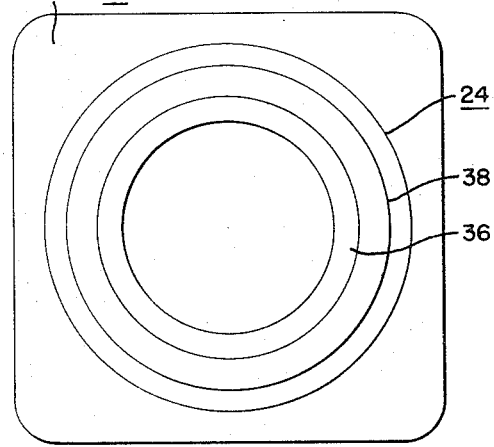
FIG. 13 is an enlarged bottom end view of the fuel assembly as illustrated in FIG. 1 of the drawings.

Referring now to FIGS. 1, 12 and 13 of the drawings, the illustrative embodiment of the invention depicted therein comprises a blanket type fuel assembly 20 having in this example an elongated tubular casing 22. The tubular casing 22 for this arrangement of the invention is formed with a substantially square cross-section, and its open ends are provided respectively with a flow nozzle assembly, indicated generally by the reference character 24, and with a spoke mounted manipulator lifting hook arrangement denoted by the reference character 26. For example, the lifting hook 26 is secured to the casing 22 by a plurality of substantially planar spokes 28 with four being employed in this example of the invention. The spokes 28 are inserted into and welded at a like number of respective end slots 30 formed in the housing 22. Desirably, the housing or casing 22 is cut away, as denoted by the reference character 32, in the areas between respective adjacent spokes 28 so that greater fluid flow access to the casing 22 is afforded by the resultant flow openings 34.

At the opposite end of the casing 22, the nozzle assembly 24 includes a pair of nested concentric tubular members 36 and 38. The outer tube 38 is slidably mounted upon the inner tube 36, while the latter tube is secured to a thickened end portion 40 which is in turn welded or otherwise secured to the adjacent end of the tubular casing 22. In order to provide shock-absorbing action when the fuel assembly is loaded in a vertical position within a reactor core structure denoted generally by the reference character 42 (FIG. 17), the outer tubular member 38 and a stop member 46 secured thereto are biased toward the adjacent end of the fuel assembly by a substantial spring 44.

Figure 17:
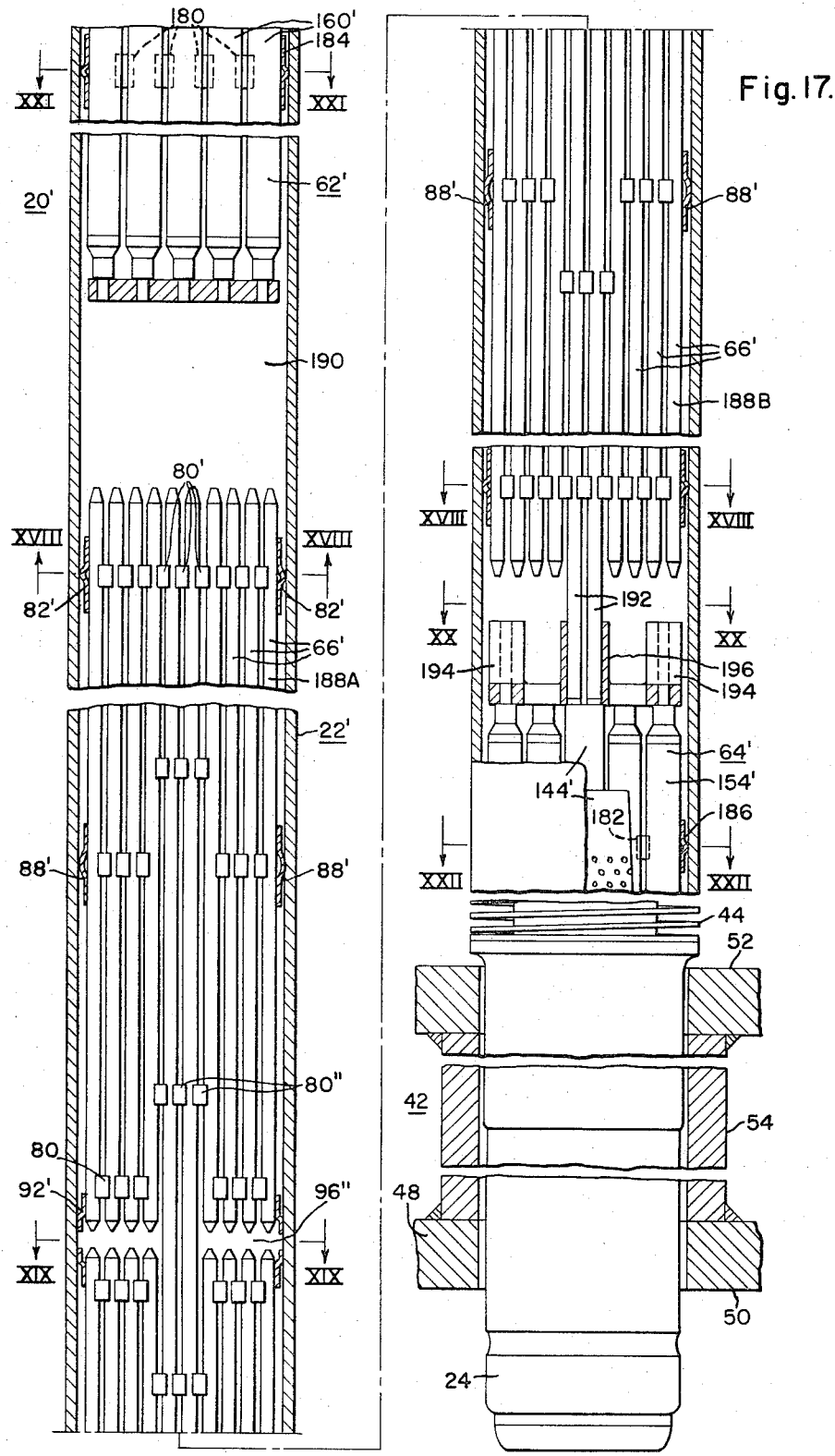
FIG. 17 is a partial, longitudinally sectioned view of still another form of the reactor fuel assembly arranged in accordance with the teachings herein and shows a lower portion of the adjacent core structure of the reactor.

The cross-sectional configuration of the nozzle 24 desirably is circular, as illustrated in FIG. 13 of the drawings, in order to facilitate insertion in the complementary opening in a bottom plate assembly 48 (FIG. 17) of the reactor core structure 42. In this arrangement as shown in FIG. 17, the bottom core plate assembly 48 includes a pair of spaced plates 50 and 52 whose separation is maintained by a plurality of spacer tubes 54 which in addition receive the fuel assembly nozzle assemblies 24. The use of the spaced bottom core plates 52 and 50 of the core enhances the beam strength of the lower plate assembly 48.

The upper or left end of the fuel assembly 20, as viewed in FIG. 1 of the drawings, is similarly supported in a complementary aperture formed in an upper core plate 56, which is also part of the reactor core structure 42. In this case, however, the aperture 58 is of generally square configuration so as to conform with that of the casing 22.

Mounted within the casing 22 and intermediately of the ends thereof are a plurality of fuel bundles, with two such bundles 60A and 60B being employed in this example of the invention. The bundles 60A and 60B are disposed in tandem generally between a pair of blanket fuel bundles 62 and 64, which are described hereinafter in greater detail.

Each of the fuel bundles 60A and 60B in this arrangement of the invention includes a plurality of relatively closely spaced fuel rods 66, with 96 such rods being employed in each of the bundles 60A and 60B in this example of the invention. As better shown in FIG. 14 of the drawings, each of the fuel rods 66 includes a casing structure or cladding tube 68 which is closed at its ends by a pair of respective frustoconical end plugs 70 and 72, shaped thereby to reduce flow resistance. Within the casing tube 68, the fuel rod is divided into a number of compartments by a plurality of spaced disks 74 which are secured at such locations by crimping the adjacent portions of the casing tube 68. The space in each of the aforementioned compartments is substantially filled by a plurality of fuel pellets denoted generally by the reference character 76, leaving an expansion space 78 within each compartment. Within each fuel bundle 60A or 60B, the fuel rods 66 are joined laterally to one another with a plurality of ferrules or short tubular members 80 in the manner described in greater detail and claimed in a copending coassigned application of Erling Frisch, entitled "Fuel Element Assembly for a Nuclear Reactor," Ser. No. 635,911, filed Jan. 23, 1957, and now abandoned. Suffice it to say however that with the arrangement shown each of bundles 60A and 60B is assembled into a rigid beam like structure by a plurality of lateral rows or arrays of the ferrules 80, which are spaced along the length of each bundles 60A or 60B and joined rigidly to adjacent ones of the fuel rods, as by brazing or the like.

As will become more evident hereinafter, the aforedescribed rigidized beam structure of each of the fuel bundles 60A nad 60B is particularly useful in a fast neutronic reactor in order to produce a controlled displacement of the fuel bundles 60A and 60B or portions thereof both in the lateral and longitudinal directions relative to the fuel assembly for the purpose of counteracting the inherent tendency of fuel elements to bow in a neutronic reactor and more particularly to compensate or rather to substitute a negative temperature coefficient for the inherently positive temperature coefficient of a fast reactor.

In furtherance of these purposes, each of the fuel bundles 60A and 60B is slidably mounted at its lateral peripheral engagements with the inner surfaces of the casing structure 22. Adjacent the respective outward or opposite end portions of the fuel bundles 60A and 60B, and as denoted by the reference lines III—III, a plurality of peripheral strap members 82 are secured at spaced locations on each of the bundles 60A and 60B as by brazing. As better shown in FIG. 3 of the drawings, the strap members 82 each completely extend about the girth of the associated fuel bundles 60A or 60B. Located on each strap 82 are a plurality of positioning dimples 84 (FIG. 4) for positive and rigid engagement with the adjacent surfaces of the casing structure 22. Thus, the positioning dimples 84 serve to locate positively the associated fuel bundles 60A or 60B coaxially within the casing structure 22. Because of their rigid engagement, the adjacent end portions of the fuel bundles 60A and 60B are not free to move laterally within the casing 22. In order to compensate for manufacturing tolerances and to prevent any tendency toward vibration within the casing structure, a plurality of stabilizing and positioning leaf spring members 86 (FIG. 5) are likewise provided on each strap member 82. As in the case of the positioning dimples 84, the leaf spring members 86 can be formed integrally with the strap member 82 by deformation with a suitable tool or punch (not shown). The spring members 86 thus provide resilient contact between adjacent portions of the fuel bundles 60A and 60B with the juxtaposed surfaces of the casing 22.

Figure 6:
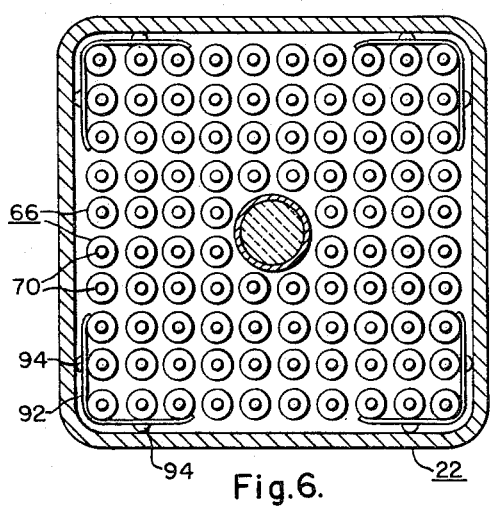
FIG. 6 is an enlarged cross-sectioned view of the fuel assembly of FIG. 1 and taken along reference line VI—VI thereof.
Figure 7:
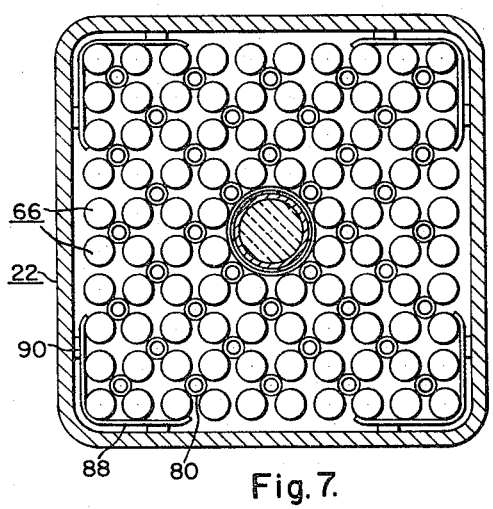
FIG. 7 is an enlarged cross-sectioned view of the fuel assembly of FIG. 1 and taken along either of reference lines VII—VII thereof.

On the other hand, adjacent the juxtaposed ends of the fuel bundles 60A and 60B, the adjacent end portions thereof are only resiliently mounted relative to the casing 22. This is accomplished by providing, in the present example, a plurality of corner strap members 88 as better shown in FIG. 7 of the drawings. Of course, the strap members 88 can be passed entirely around the girth of the associated fuel bundles 60A and 60B but is not essential in this case, since the straps 88 are arranged only for resilient engagement with the adjacent inner surfaces of the casing 22. Thus, each of the corner straps 88 is provided with a pair of stabilizing spring 90 which desirably are formed integrally with the associated straps 88 as described previously in connection with the spring members 86 illustrated in FIGS. 3 and 5 of the drawings. Likewise, similar corner strap members 92 are provided at each juxtaposed end of the fuel bundles 60A and 60B as better shown in FIG. 6. Each strap member 92 is provided with finger like spring projections 94 which in turn afford lateral, resilient engagement with the adjacent surfaces of the casing 22. It will be seen then that the positioning dimples 84 are entirely omitted from the corner straps 88 and 92 so that substantially one-half or more of each fuel bundles 60A or 60B is free to bow or to bend laterally relative to the casing 22 and within the confines thereof and against the action of the spring members 90 and 94.

In order to facilitate such bowing or bending of each fuel bundle 60A and 60B, suitable structural means are provided in each fuel assembly in order to maintain a spacing or gap 96 between the juxtaposed ends of the fuel bundles 60A and 60B. The aforesaid structural means can be arranged in a variety of ways. For example, each outward end of the fuel bundles 60A and 60B can be more or less rigidly secured to the adjacent or inner end of the associated blanket fuel bundle 62 or 64 respectively. One example of securing a fuel bundle to a blanket bundle is illustrated in FIG. 1 and presently described in connection with the outer end of the fuel bundle 60B and the inner end of the blanket bundle 64. Alternatively, each outer end of the fuel bundles 60A and 60B can be rigidly joined (not shown) to the adjacent portion of the casing structure 22 and spaced from one another so that the gap 96 is of sufficient width to allow for thermal elongation of the fuel bundles 60A and 60B.

By the same token, the adjacent end plates 98 and 100 of FIG. 15 can be rigidly joined relative to the interior of the casing 22 in order to preserve the gap 96' therebetween and in order to permit the fuel bundles 200 and 202 to elongate thermally away from one another. In the latter case, the adjacent or juxtaposed end portions of the fuel bundles 200 and 202 can be provided with the positive positioning straps 82 of FIGS. 3, 4 and 5 while the opposite or outer end portions can be provided with the corner stabilizing spring straps 88 and 92 as described above in connection with FIGS. 6 and 7. With this last-mentioned arrangement, of course, the outer end portions of the fuel bundles would bend away from the central axis of the reactor core structure with the result that the net displacement of the fuel material would occur at the periphery of the core structure and therefore would introduce a much smaller factor of negative coefficient of reactivity, although, of course, the positive factor would be eliminated. However, FIG. 15 shows the peripheral strap members 82 and corner strap members 88 and 92 in the same relative positions as shown in FIG. 1 so as to permit the fuel bundles 200 and 202 to bend in the same manner as previously described for fuel bundles 60A and 60B shown in FIG. 1.

Figure 2:
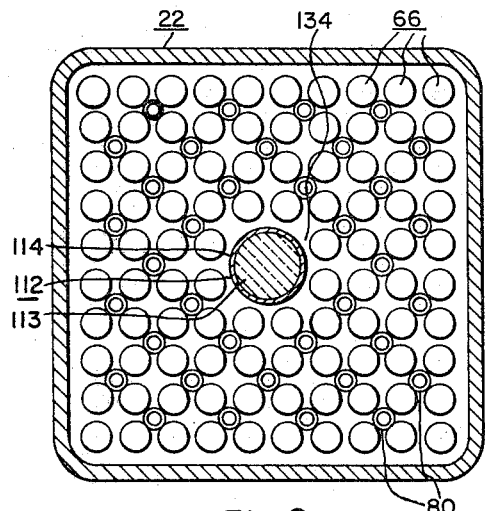
FIG. 2 is an enlarged cross-sectioned view of the fuel assembly of FIG. 1 and taken along any of reference lines II—II thereof.
Figure 8:
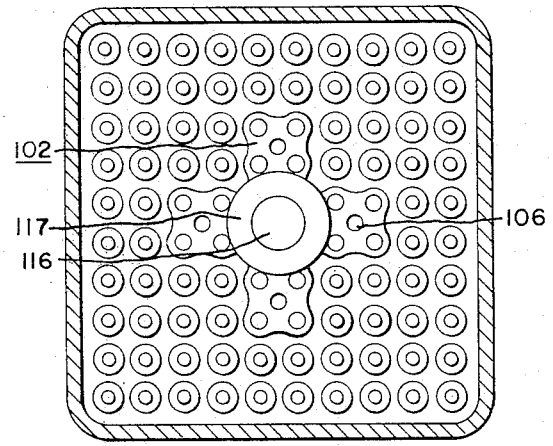
FIG. 8 is an enlarged cross-sectioned view of the fuel assembly above the left-hand fuel bundle as viewed in FIG. 1 of the drawings and taken along reference line VIII—VIII thereof.

Returning now to the specific structural means for mounting each of the fuel bundles 60A and 60B of FIG. 1, it will be seen that the outer end of each fuel bundle 60A or 60B is provided with a partial end plate 102 or 104 of cruciform configuration in this example. The end plates 102 and 104, together with other structural components of the fuel assembly, can be fabricated from stainless steel or from zirconium or one of its alloys. The cruciform configuration minimizes resistance to coolant flow longitudinally through the fuel assembly casing 22, and the resistance thereof is further reduced by the provision of at least one coolant flow opening 106 (FIG. 8) in each arm of the cruciform end plate 102 or 104. As better shown in FIG. 8, each end plate 102 or 104 is joined to the adjacent end plugs of the 16 fuel rods which are longitudinally aligned with the associated end plate. The end plates 102 and 104 are thus securely affixed to the outer ends of their associated fuel bundles 60A and 60B inasmuch as all of the fuel rods 66 of each bundle are joined laterally and rigidly to one another as explained above in connection with FIGS. 2 and 3 of the drawings.

In addition to its cruciform arms, each partial end plate 102 or 104 includes a central hub member 108 or 110 respectively, which is additionally arranged for joining the end plate to associated structural components of the fuel assembly. The end plates 102 and 104 and their associated fuel bundles 60A and 60B are maintained in their tandemly spaced relation by means of a continuous structural member, in this case a rod 112 which extends longitudinally and desirably centrally through both of the fuel bundles 60A and 60B and across the gap 96 therebetween. For best utilization of fuel inventory, desirably the rod 112 includes a quantity of nuclear fuel material 113 (FIG. 2) contained in a suitable casing or cladding structure 114 which is sealably closed at its ends by end plugs 116 in any well known manner as by welding. The end plugs 116 are secured to the end plate hub members 108 and 110 by nuts 117.

In order to preserve at all times, the gap 96 between the fuel bundles 60A and 60B during thermal cycling of the fuel assemblies under all reactor operating conditions, it is desirable to provide the rod 112 with at least the same thermal coefficient of expansion exhibited by the fuel rods 66 of each fuel bundle. Thus, as the juxtaposed ends of the fuel bundles 60A and 60B tend to move toward each other as the fuel bundles thermally elongate and thus tend to close the gap 96, the end plate 102 is moved, by the longitudinal expansion of the rod 112, at least an equivalent distance toward the adjacent fertile bundle 62 for the purpose of at least maintaining the gap 96 between the fuel bundles. From the foregoing it is readily apparent that the rod 112 is used as a structural support for the fuel bundles 60A and 60B and for maintaining the gap 96 therebetween. To provide for such movement of the end plate 102 by the central rod 112, an additional gap 118 is provided between end plate 120 of the fertile bundle 62 and the partial end plate 102 of the adjacent fuel bundle 60A.

With this arrangement as the reactor temperature increases, the central supporting rod 112 will tend to elongate in the direction denoted by arrow 122. At the same time, each of the fuel bundles 60A and 60B will tend to elongate only axially in the regions of their positive positioning straps 82 as denoted by arrows 124 and 126 respectively. However, in the regions of the stabilizing corner straps 88 and 92, the fuel bundles 60A and 60B will tend not only to elongate toward each other but also to bend laterally as beams in the direction denoted by arrows 128 and 130 respectively. The direction of bending or bowing results from the assumption that the right side of the fuel assembly, as viewed in FIG. 1 of the drawings, is presented toward the central, hottest, or highest flux portion of the reactor core. Accordingly, those fuel rods 66 on the hottest side of the fuel assembly will be elongated slightly more than those rods on the opposite sides of the fuel bundles 60A and 60B, with the result that the fuel bundles 60A and 60B will bend as shown by arrows 128 and 130 respectively, since the fuel rods 66 of each bundle are joined laterally and rigidly to one another. As a result, the indicated lateral movement of the juxtaposed end portions of the fuel bundles 60A and 60B displaces fuel material away from the central or hottest portion of the reactor core in order not only to compensate for bowing of the fuel elements but also to introduce a factor of negative coefficient of reactivity due to such displacement.

Figure 3:
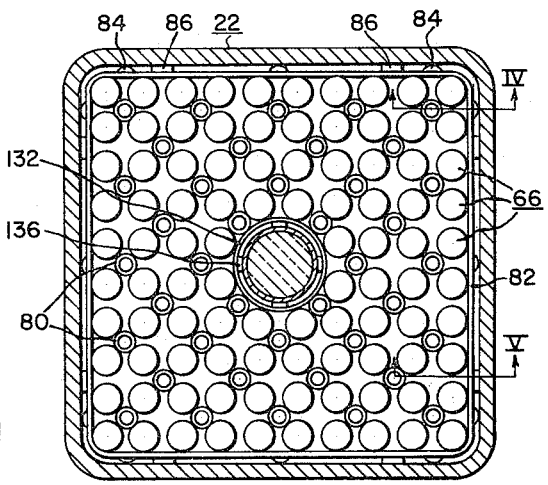
FIG. 3 is another enlarged cross-sectioned view of the fuel assembly of FIG. 1 taken along any of reference lines III—III thereof.
Figure 4:
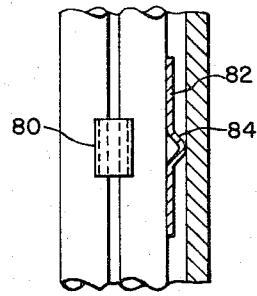
FIG. 4 is an enlarged partial longitudinally sectioned view of the fuel assembly illustrated in FIG. 3 of the drawings and taken along reference line IV—IV thereof.
Figure 5:
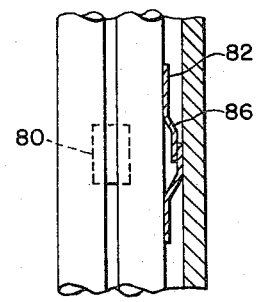
FIG. 5 is an enlarged partial longitudinally sectioned view of the fuel assembly illustrated in FIG. 4 and taken along reference line V—V thereof.

Due to the various differential movements between the central supporting rod 112 and the fuel bundles 60A and 60B as denoted by the aforementioned arrows 122–130, the central rod 112 desirably is mounted slidably and resiliently throughout its passage through the fuel bundles 60A and 60B. One arrangement for so doing is illustrated in FIGS. 1 and 3 of the drawings. Thus, a plurality of resilient ring members 132 (FIG. 3) are inserted into and closely fitted within the central longitudinal passage 134 (FIG. 2) extending through each of the fuel bundles 60A and 60B. Desirably, the ring members 132 closely engage the eight surrounding fuel rods and are spaced along the length of the aforementioned passage 134. Each ring member 132 desirably is provided with a plurality of stabilizing spring members 136 formed integrally therewith in the manner described above in connection with the peripheral spring members 86 (FIG. 5). The spring members 136 are disposed to engage resiliently the central supporting rod 112 which is inserted through the ring members 132.

The assembly thus comprising the two fuel bundles 60A and 60B, their end plaes 102 and 104 and the central supporting member 112 extending therebetween is then joined at the outward end or bottom end as viewed in FIG. 1 of the drawings of the fuel bundle 60B by securing the outward end of the hub 110 of the partial end plate 104 to a similar hub member 138 of end plate 140 forming part of the fertile fuel bundle 64. This joint can be effected by inserting the adjacent end of the hub 110 into a counter sunk portion 142 of the blanket end plate 140 in a shrink fit manner or by welding, threading, or the like. In this example, the end plug 116 has a shoulder 123 bearing against hub 110, and the nut 117 is utilized to secure hub 110 to hub 138. Then a frustoconical strainer 144 is joined at its larger end as by welding to the end plate member 146 of the fertile bundle 64. The end plate 146, which is annular in configuration, in turn is secured to the inner surface of the fuel assembly casing 22 preferably at the welded junction therebetween and the hollow end piece 40 all of which are secured by the circumferential weld 148. The frustoconical strainer 144 extends from end plate 146 towards end plate 140 to a location denoted by reference character 149, which is a short distance from the nut 117. However, a strainer 144' can also be extended towards end plate 194 (FIG. 17) until it engages the end plate 194 so as to support the fuel rods 192 and their associated structure. The frustoconical strainer 144 is perforated at the top and along its length as denoted by the reference character 150 in order to provide flow communication of the flow passages among the rods of the fertile bundles 62 and 64 and the fuel rods 66 with the interior of lower nozzle structure 24 as denoted by flow arrow 152.

Figure 10:
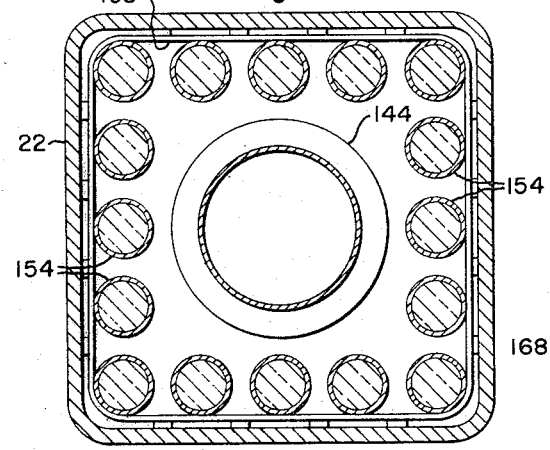
FIG. 10 is an enlarged cross-sectioned view of the right-hand fertile portion of the fuel assembly illustrated in FIG. 1 and taken along reference line X—X thereof.

In this arrangement, the fertile bundle 64 is finally completed by a plurality of fertile material bearing rods 154 which generally surround the frustoconical strainer 144, as better shown in FIG. 10 of the drawings. Each of the rods 154 is rigidly joined at its ends to the end plates 140 and 146 respectively. Expansion of the rods 154 in the fertile bundle 64 and differential expansion among the rods 154 are afforded by means of a gap 156 between the outer periphery of end plate 140 and the casing 22. Adjacent the end plate 140 of the fertile bundle 64, the rods 154 are supported laterally by a strap member 158 which is arranged in a manner similar to the strap members 82 described above in connection with FIGS. 3, 4 and 5 of the drawings.

Figure 11:
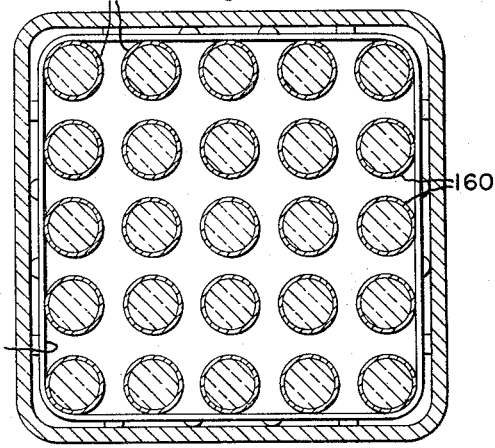
FIG. 11 is an enlarged cross-sectioned view of the left-hand fertile portion of the fuel assembly of FIG. 1 taken along reference line XI—XI thereof.

The upper or left hand fertile bundle 62 is formulated in a similar manner with the exception that the frustoconical strainer 144 is not utilized. As better shown in FIG. 11, it will be seen that the fertile bundle 62 is fabricated from a plurality of fertile material bearing rods 160 supported at their ends by a pair of spaced end plates 120 and 162. The upper end plate 162 is closely fitted within the fuel assembly casing 22 and in addition is provided with, in this example, four tabs 164 which are respectively inserted into the slots 30 at the adjacent end of the casing 22. Such insertion is made, of course, before assembling the hook member 26 to the housing 22. Following such assembly, however, the hook member 26 and the end plate 162 are secured in their illustrated positions on the housing 22 by means of suitable weldments 166.

The other end plate 120 of the fertile bundle 62 is mounted in a "floating" manner by securance to the adjacent ends of the fertile rods 160. Finally, the free end or lower end of the fertile bundle 62 is supported laterally by a strap member 168 which is similar to the strap 158 described above in connection with the other fertile bundle 64.

Inasmuch as the fertile rods 154 and 160 of the fertile bundles 64 and 62, respectively, are not each joined rigidly and laterally to adjacent fertile rods, it is anticipated that little or no bowing of the fertile bundles 64 and 62 will occur. Any such bowing for fertile bundle 62 that does occur, however, will be exerted downwardly and laterally against the fuel assembly casing 22, as viewed in FIG. 1 of the drawings, and away from the hottest portion of the reactor core so that any such bowing will tend to displace fuel material away from the hottest portion of the reactor core to further enhance the negative coefficient of reactivity introduced by the fuel assembly of the invention.

Figure 9:
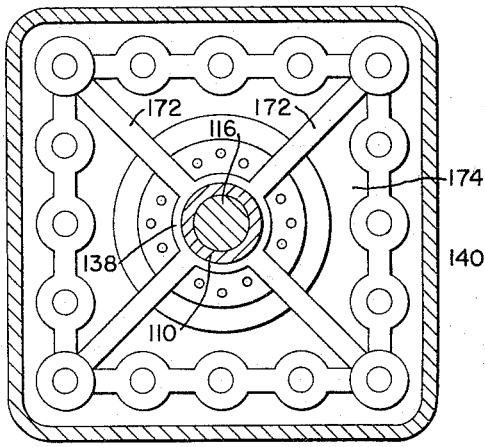
FIG. 9 is an enlarged cross-sectioned view of the fuel assembly above the right-hand blanket or fertile rod bundle as viewed in FIG. 1 of the drawings and taken along reference line IX—IX thereof.

The use of the lateral supporting straps 158 and 168 of the fertile bundles 64 and 62 further maintains the fertile bundles coaxially of the fuel assembly casing 22 so as not to interfere with the symmetric flow of coolant fluid therethrough. As evident from FIG. 12 of the drawings such coolant flow is conducted through relatively large flow openings 170 provided in the upper fertile plate 162. Similar openings (not shown) are provided in the lower fertile plate 120 of the fertile bundle 62. In the lower fertile bundle 64, which is substantially comprised of an annular array of fertile rods 154, coolant flow is conducted therethrough by means of imparting an annular configuration to the end plate 140 as better shown in FIG. 9 of the drawings. The end plate 140 is supported on its central hub member 138 by means of a plurality of spokes 172. Thus, several large flow openings 174 are afforded in the end plate 140 through which coolant is conducted from the perforated frustoconical strainer 144 in the manner described above.

Any tendency of the upper fertile bundle 62 to elongate thermally will, of course, move the lower end plate 120 into the gap 118 provided between the end plate 120 and the upper partial plate 102 of the fuel bundle 60A for the previously mentioned purposes. In a like manner, tendency of the lower fertile rods 154 to elongate thermally will move the central supporting rod 112 and its associated structure towards and/or into the gap 118, as the central supporting rod 112 is a continuous length extending from end plate 140 through the two fuel bundles 60A and 60B. On the other hand, any tendency of the lower fertile rods 154 to elongate differentially as to each other will flex the central supporting rod 112 or the spokes 172 of the end plate 140 of the fertile bundle 64, inasmuch as little or no heat will be generated in the perforated frustoconical strainer 144. Therefore, thermal elongation of the lower fertile bundle 64 will not in turn cause a significant radial displacement of the fuel bundles 60A and 60B.

Referring now to FIGS. 17 to 22 of the drawings, another form of the fuel assembly of the invention is illustrated therein. The outward appearance of the fuel assembly 20' of FIG. 17 is substantially identical to that of FIG. 1, and accordingly the upper and part of the lower end portions and associated upper core plate 56 have been eliminated. In the form of the invention now under consideration, the fuel assembly includes a casing structure 22′ containing adjacent its end portions upper and lower fertile bundles 62′ and 64′ respectively. The fertile bundles 62′ and 64′ are substantially identical to the fertile bundles 62 and 64 respectively of FIG. 1 with the exception that in each bundle 62′ and 64′ at least one transverse array of connecting ferrules 180 or 182 respectively are employed to join rigidly and laterally the fertile rods 160′ or 154′ to one another in order to rigidize the fertile bundles 62′ and 64′. The aforementioned arrangements are shown respectively in FIGS. 21 and 22, which also show the use of circumferential straps 184 and 186 for use in positioning the adjacent portions of the bundles 62′ and 64′ respectively relative to the inner surface of the fuel assembly casing 22′. The straps 184 and 186 are fabricated similarly to the straps 82, 158 and 168 of FIGS. 1 to 4 of the drawings. With the added, rigidized characteristic of the fertile bundle 62′ and 64′, the latter will now bend as beams away from the central, hottest, or highest flux portion of the reactor core, if any differential expansion occurs among the rods 160′ or 154′, carrying with them a slight displacement of the intermediate portion of the fuel assembly housing 22′ together with the fuel material housed therein.

Figure 19:
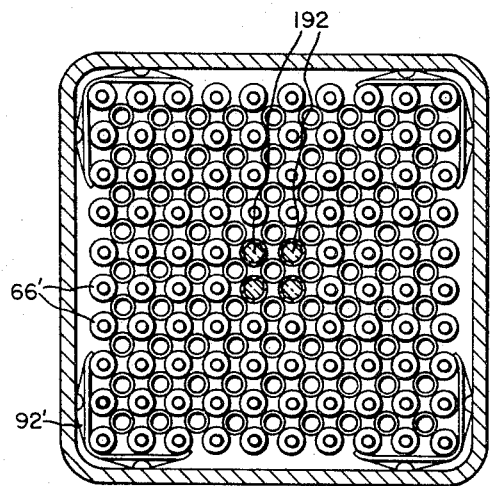
FIG. 19 is an enlarged cross-sectional view of the fuel assembly illustrated in FIG. 17 and taken along reference line XIX—XIX thereof.
Figure 20:
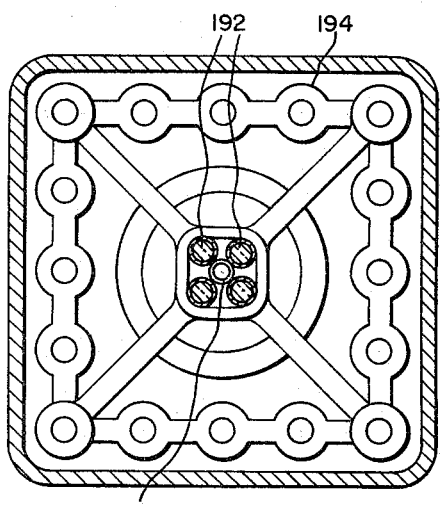
FIG. 20 is an enlarged cross-sectional view of the fuel assembly illustrated in FIG. 17 and taken along reference line XX—XX thereof.
Figure 21:
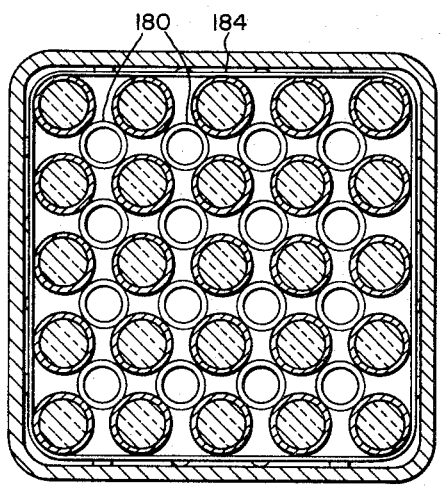
FIG. 21 is an enlarged cross-sectional view of the fuel assembly illustrated in FIG. 17 and taken along reference line XXI—XXI thereof.
Figure 22:
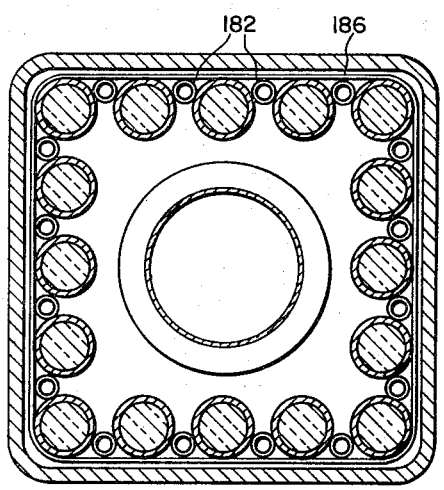
FIG. 22 is an enlarged cross-sectional view of the fuel assembly illustrated in FIG. 17 and taken along reference line XXII—XXII thereof.

Referring now principally to FIGS. 17, 18 and 19, it will be seen that the intermediate portion of the fuel assembly housing 22′ includes a pair of tandemly spaced fuel bundle arrangements 188A and 188B. The fuel bundles 188A and 188B are supported within the fuel assembly casing 22′ in much the same manner as described previously in connection with the fuel bundles 60A and 60B. There are, however several important differences in the specific mounting or supporting structure. It will also be understood as this description proceeds that a greater number of fuel bundles 188 than that shown can be employed in certain applications of the invention.

As in the case of FIG. 1, the form of the invention of FIG. 17 is arranged with an expansion space 190 between the upper fertile bundle 62′ and the upper fuel bundle 188A in order to accommodate the opposing thermal elongations of the fertile bundle and the fuel bundle which are slidably mounted within the casing 22′ as noted above in connection with FIG. 1.

A glance at FIG. 17 also reveals that the end plates associated with the fuel bundles 62 and 64 of FIG. 1 have been eliminated. Similarly, the central longitudinal supporting rod 112 of FIG. 1 is omitted and its function is performed, in this example, by four centrally disposed and continuously extending fuel rods 192 through both of the fuel bundles 188A and 188B, as better shown in FIG. 18.

Each of the fuel bundles 188A and 188B is otherwise made up of a plurality of fuel rods 66′, which in this example are similar to the fuel rod 66 described above in connection with FIG. 1 and 14 of the drawings. The fuel rods 66′ are arranged in a square lattice array as shown in FIGS. 18 and 19 of the drawings, which further show that each of the central supporting rods 192 are of substantially the same cross-sectional as the fuel rods 66′. With this arrangement, each fuel bundle 188A or 188B is afforded a more even or regular geometry such that hot spots and impedance to coolant flow therethrough is minimized.

At the outward or opposite ends of the fuel bundles 188A and 188B, all of the fuel rods 66′ thereof together with the adjacent portions of the central supporting rods 192 are joined laterally and rigidly with the employment of a suitable number of relatively short flow conducting ferrules 80′, as illustrated in FIG. 18. The ferrules 80′ are generally similar to the ferrules 80 described previously in connection with FIGS. 1 to 3 of the drawings. However, in the case of FIG. 17, the outermost lateral array of ferrules presently under discussion are not staggered as in the case of FIGS. 2 and 3, inasmuch as the partial end plates 102 and 104 associated therewith are not employed in the modification of the invention presently under discussion.

When assembling the fuel bundle 188A or 188B, the straps 82′, the ferrules 80′ and all of the fuel rods 66′ together with the central supporting rods 192 are brazed or otherwise secured together laterally into a rigid unit, which also serves to join the outermost end of the fuel bundle 188A or 188B to the associated end portions of the central supporting rods 192. Similarly, lateral supporting straps 82′, 88′ and 92′ are secured along the length of each fuel bundle 188A and 188B for the purposes described previously in connection with similar items of FIG. 1.

The central supporting rods 192 extend through both bundles 188A and 188B and across the gap 96″ therebetween as shown by FIG. 17. The central supporting rods protrude from the lower or right end of the fuel bundle 188B as view in FIG. 17 of the drawings and as further shown by FIG. 20 thereof for connection to the adjacent end plate 194 of the lower fertile bundle 64′ in a manner presently to be described.

In those applications wherein the central supporting fuel rods 192 are fabricated from the same material as the other fuel rods 66′ and therefore have the same coefficient of thermal elongation, the remainder of each fuel bundle 188A or 188B can be laterally joined at spaced locations therealong in a similar manner such as that described in connection with FIG. 18.

The protruding lower ends of the supporting fuel rods 192 are inserted into a suitably shaped hub portion 196 of the end plate 194 forming part of the lower blanket assembly 64′. Securance therebetween is afforded by brazing the lower end portions of the supporting rods 192 to the inner wall surfaces of the hub 196 and to a central separating ferrule 198 as better shown in FIG. 20 of the drawings.

Thus, the lower ends of the supporting rods 192 are attached to the upper end of the lower blanket assembly 64′ in the manner similar to that described previously in connection with the central supporting rod 112 of FIG. 1. The fuel bundles 188A and 188B, however, are slidably mounted within the casing 22′ and are arranged for bowing compensation in the same manner as the fuel bundles 60A and 60B of FIG. 1. The necessary gap 96″ therefore is preserved during all thermal conditions of reactor operation by the fact that the supporting rods 192 have at least the same coefficient of thermal expansion as the fuel rods 66′. On the other hand, as will be described in greater detail hereinafter, the central supporting rod 112 or the supporting rods 192 can be fabricated from structural and/or nuclear fuel materials, for example a cermet, having a significantly larger coefficient of thermal elongation than the fuel rods 66 or 66′. With the latter arrangement, the gap 96 or 96″ will be widened and the associated fuel bundles moved apart as the temperature of rod 112 or rods 192 increases in order to enhance a negative coefficient of reactivity or to introduce such a coefficient in certain applications of the invention.

Figure 23:
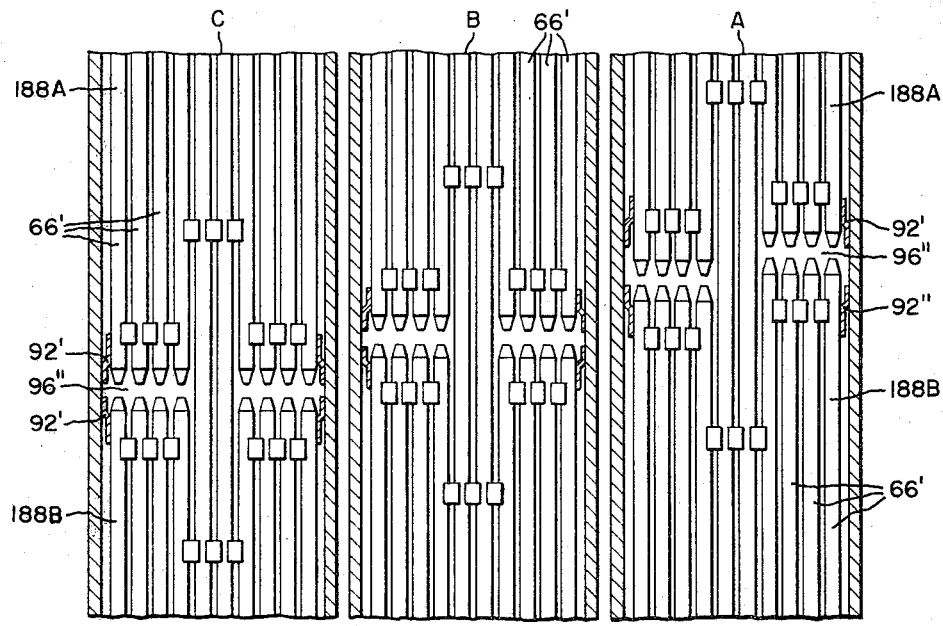
FIG. 23 is a partial, longitudinally sectioned view of a portion of a reactor core constructed in accordance with the invention and illustrating portions of a plurality of adjacent fuel assemblies, with each being arranged also in accordance with the invention.

Before proceeding further, however, with this aspect of the invention, a word should be said concerning the prospects of radiation-streaming when employing a plurality of the fuel assemblies of FIG. 1 or of FIG. 17 in order to formulate a reactor core. Of course, such radiation-streaming can be minimized or avoided all together by avoiding the placement of all of the gaps 96 or 96″ in the same horizontal plane passing through the reactor core. This can be accomplished readily by employing one or both of the arrangements illustrated in FIG. 23 of the drawings. With the arrangement shown, radiation-streaming is minimized by staggering portions of the gap 96″ as in fuel assembly A or by staggering the gaps of adjacent fuel assemblies as illustrated by assemblies B and C of FIG. 23. Either arrangement can be accomplished readily by providing longer and shorter fuel rods 66 or 66' in each fuel bundle 60 or 188 as in fuel assembly A or by providing longer and shorter fuel bundles and relatively reversing the same as in fuel assemblies B and C.

Returning again to FIG. 17 of the drawings, a number of arrangements will now be described for slidably mounting the central supporting rods 192 relative to the adjacent portions of the fuel bundles 188A and 188B other than the outer opposite ends thereof, which are rigidly joined to the supporting rods 192, as aforesaid. One such arrangement consists in forming the fuel bundles 188A and 188B by joining all of the fuel rods 66' laterally with their associated ferrules 80 and 80' but omitting the central supporting rods 192 and their associated ferrules as denoted by the reference lines 199 of FIG. 18. The omitted supporting rods 192 and their ferrules are then joined laterally as by brazing, in the manner described in the aforementioned copending application. The separate sub-assembly thus formed by the supporting rods 192 is then inserted into the channels formed through both of the fuel bundles 188A and 188B by the previously mentioned omission of the supporting rods 192. With brazing material having been first applied to the ferrules 80' at the end portions only of the sub-assembly of supporting rods 192, the fuel bundles 188A and 188B are positioned on the sub-assembly with the proper gap between the fuel bundles. Then the end portions thereof are heated sufficiently to braze and rigidly join the supporting rods 192 to the outer or opposite end portions of the bundles 188A and 188B. The remainder of the sub-assembly of supporting rods 192, however, is free to elongate differentially relative to the surrounding remaining portions of the fuel bundles 188A and 188B, because in the example the ferrules 80" are secured only to the supporting rods 192. The expansion space 190 can, of course, be varied in keeping with the anticipated displacement of the fuel bundles 188A relative to the fuel bundle 188B as governed by the selection of fabricating and fuel materials for the central supporting rods 192 and the fuel rods 66'. Thus, the degree of negative coefficient of reactivity can likewise be varied depending upon the type of reactor for which the fuel assembly is employed. Of course, the greatest rate of displacement with increase in temperature as anticipated will be accorded to the fuel assembly of FIG. 1 or FIG. 17 when employed in a fast reactor core for the reasons aforesaid.

Referring now to FIGS. 15 and 16 of the drawings, an arrangement is illustrative therein for providing the maximum possible displacement of the fuel bundles 200 and 202 illustrated therein. The fuel bundles 200 and 202 are generally similar to the fuel bundles 60A and 60B, respectively of FIG. 1 with the exceptions that end plate means 98 and 100 are provided adjacent the juxtaposed ends and define the gap 96' therebetween rather than being disposed at the outward or opposite ends of the fuel bundles 200 and 202. For reasons also to be presently described, the bundles 200 and 202 differ in other important respects. The central supporting rod 112' at its passage through each of the bundles 200 and 202 is loosely encased in a central supporting sleeve 204 and 206 respectively. At their juxtaposed ends, i.e. adjacent the gap 96', the sleeves 204 and 206 are securely joined to the end plates 98 and 100 respectively. At their outer or opposite ends, the sleeves 204 and 206 are rigidly secured in this example by short spoked arrangements, denoted generally by the reference characters 208 and 210 respectively, to the central supporting rod 112'. Thus, with the arrangement of FIG. 15, the juxtaposed or inner ends of the fuel bundles 200 and 202 are rigidly joined to the outer end portions of the central supporting rod 112', rather than the outer or opposite ends of the fuel bundles as is the case of the bundles 60A and 60B in FIG. 1 or the bundles 188A and 188B in FIG. 17.

In the arrangement of FIG. 15, it is contemplated that the supporting sleeves 204 and 206 be fabricated from non-fuel bearing material such as stainless steel, such that the sleeves will have a lower coefficient of thermal elongation relative to the fuel rods 66". Therefore, at least a portion of the thermal elongation of the fuel rods 66" will be additive relative to the thermal elongation of the central supporting rod 112' by further displacing fuel material away from the gap 96' and therefore the median horizontal plane of the reactor core, when the fuel assemblies are disposed vertically as is the case in most present or contemplated reactor designs. It is also contemplated that when a number of fuel assemblies corresponding to the modification of either FIG. 1 or FIG. 15 be employed in a reactor core that gaps 96 or 96' thereof can be staggered relative to adjacent fuel assemblies in the manner described previously in connection with FIG. 23 of the drawings.

Figure 24:
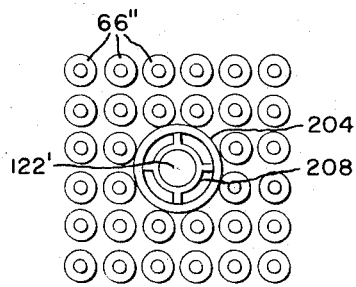
FIG. 24 is an enlarged partial cross-sectional view of the fuel assembly illustrated in FIG. 15 and taken along reference line XXIV—XXIV thereof.
Figure 25:
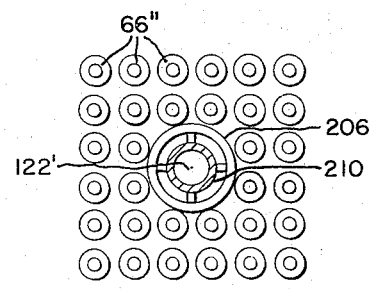
FIG. 25 is an enlarged partial cross-sectional view of the fuel assembly of FIG. 15 and taken along reference line XXV—XXV thereof.

As described above in connection with the central supporting rod 112 of FIG. 1, it is intended in certain applications that the central supporting rod 112' be a fuel-bearing member, which arrangement of course, will necessitate supplying a certain amount of the coolant fluid thereto. In furtherance of this purpose and as illustrated in FIGS. 24 and 25, the spoked arrangements 208 and 210 afford coolant passages and access thereof to the annular spaces 212 maintained between the sleeves 204 and 206 and the central supporting rod 112'. The spaces 212 are maintained by means of dimples 214 preferably embossed on the inner surfaces of the sleeves 204 and 206, which desirably are further arranged together with the spoked arrangements 208 and 210 to maintain the central supporting member 112' coaxially within the sleeves 204 and 206.

Inasmuch as the sleeves 204 and 206 are non-fuel-bearing, they can engage directly the adjacent surfaces of the adjacent fuel rods 66" to provide support thereto throughout the length of the fuel bundles 200 and 202. However, if it is found in certain applications that hot spots develop at the junctions therebetween or if vibration ensues, then the sleeves 204 and 206 can be resiliently mounted within the associated bundles 200 and 202 by means of resilient ring members (not shown) such as those ring members 132 described above in connection with FIGS. 1 and 3 of the drawings by inserting the ring members coaxially between the sleeves 204, 206 and the adjacent fuel elements 66". The fuel bundles 200 and 202 are tandemly supported within the casing 22" of the fuel assembly by securing the spoked support 210 to a hub member 138' which in turn is joined to suitable supporting means (not shown) such as the end plate means 140 illustrated in FIG. 1. It is contemplated, of course, that the upper and lower fertile bundles 62 and 64 such as described in connection with FIG. 1 of the drawings can be employed in the fuel assembly of FIG. 15. With the central supporting rod 112' being spaced from the sleeve 204 and 206, coolant flow is afforded to the annular spaces therebetween as denoted by flow arrows 216.

From the foregoing, it will be apparent that novel and efficient forms of nuclear fuel assemblies have been disclosed herein. The various modifications of the fuel assembly as disclosed, can be employed to advantage in either thermal, epithermal, or fast nuclear reactors, wherever the problems of bowing occur or whenever it is desired to enhance or to introduce a negative coefficient of reactivity into the chain reacting mass.

Accordingly, numerous modifications of the invention will occur to those skilled in the art without departing from the spirit and scope of the invention. Moreover, certain features of the invention can be employed without a corresponding use of other features thereof. For example, either or both of the inventive features relating to bowing compensation and to the introduction of a negative coefficient of reactivity can be employed without utilizing one or both of the fertile bundles illustrated herein.

We claim as our invention:

1. In a nuclear fuel assembly the combination comprising an elongated casing structure, at least two fuel bundle portions spacedly disposed in tandem relationship within said casing structure, each of said bundle portions being formulated from a plurality of elongated fuel elements extending longitudinally of said casing structure in a generally parallel spaced array, at least one but less than all of said fuel elements extending continuously into each of said bundle portions and across the space therebetween, means for joining said one fuel element at one end thereof to an end portion of said casing structure to provide support for said fuel bundle portions, means within said casing structure for resiliently and laterally supporting those end portions of said fuel bundles which are adjacent said space to afford limited lateral movement relative thereto, and means for laterally supporting the other end portions of said fuel bundles substantially rigidly with said casing structure so that uneven heating of said fuel bundles will cause the latter to move away from the hottest portion thereof, and said one fuel element being disposed to permit ready bowing thereof at said space.

2. The combination recited in claim 1 wherein said fuel elements are rod shaped and said one fuel element extends centrally through said fuel bundle portions.

3. The combination of claim 1 including a perforated frustoconical flow conducting member which is joined at its one end to said casing structure and which is joined at its other end to one end of said one fuel element so that coolant fluid communicates through said frustoconical member to the spaces among said fuel elements.

4. The combination recited in claim 1 including a perforated frustoconical member laterally surrounded by a plurality of elongated fertile elements disposed within said casing structure in tandem relationship with said fuel bundle portions and generally in the path of coolant flow flowing through said frustoconical member.

5. The combination of claim 2 wherein the rods in each of said fuel bundle portions are joined rigidly and laterally to one another and to said one rod by a plurality of transversely extending arrays of flow conducting ferrules, said arrays being spaced along the length of each of said fuel bundle portions.

6. The combination of claim 5 wherein those ferrules engaging said one rod and disposed in that array of ferrules in each bundle portion adjacent said space being offset further outwardly from said space in order to reduce the stress upon said one rod during bowing of said fuel bundle portions.

7. In a fuel assembly for a nuclear reactor, the combination comprising an elongated support structure, at least two elongated guel bearing portions disposed in spaced tandem relation juxtaposed to said elongated support structure, each of said portions having a plurality of coolant flow openings extending longitudinally therethrough, an elongated continuous supporting member extending longitudinally into each of said portions and across a space therebetween, said supporting member secured to each of said portions and protruding from the outer end of one of said portions, means for joining said protruding end to the adjacent end portion of said elongated support structure to support said fuel bearing portions, resilient means for laterally supporting that section of each of said fuel bearing portions which is adjacent said space, and rigid means for laterally supporting the remote sections of said fuel bearing portions respectively so that uneven heating of said fuel bearing portions causes the latter to bow away from the hottest sides thereof.

8. The combination of claim 7 wherein said supporting member is rigidly joined at its ends to the outer end portions respectively of said fuel bearing portions and is slidably mounted within the remaining sections of said fuel portions.

9. The combination of claim 7 including a mass of fertile material mounted at each end portion of said elongated support structure, said fertile masses each having coolant channels extending longitudinally therethrough and communicating with the coolant openings of said fuel bearing portions.

10. The combination of claim 1 including a plurality of said fuel elements extending continuously into each of said bundle portions and across the space therebetween.

11. The combination of claim 10 wherein said continuous fuel elements extend centrally into said bundle portions and each of said bundle portions is arranged in a predetermined lattice array.

12. The combination of claim 2 wherein said rods are joined laterally to one another and to said one rod by at least one transversely extending array of flow conducting ferrules for each fuel bundle portion, each said array being disposed at the remote section of its associated fuel bundle portion.

13. The combination of claim 7 wherein each of said resilient means comprises at least one stabilizing strap secured to said fuel bearing portion, said stabilizing strap having formed therein a plurality of spring projections in resilient engagement with said elongated support structure, and each of said rigid means comprises at least one peripheral strap secured to said fuel bearing portion, said peripheral strap having formed therein a plurality of positioning dimples in positive and rigid engagement with said elongated support structure.

14. The combination of claim 13 wherein each of said rigid means comprises at least two of said peripheral straps spaced longitudinally from one another within the outer half of said fuel bearing portion.

15. The combination of claim 7 including at least one short ring member for each fuel bearing portion, each said ring member disposed around said supporting member and between said supporting member and said fuel bearing portion, said ring member having a plurality of spring members formed therein to engage resiliently said supporting member and having its outer periphery in engagement with its associated fuel bearing portion.

16. The combination of claim 13 wherein each peripheral strap has formed therein adjacent said positioning dimples a plurality of spring projections capable of resilient engagement with said elongated support structure.

17. In a fuel assembly for a neutronic reactor, the combination comprising a plurality of elongated fuel bundles spacedly disposed in tandem relationship, an elongated supporting member coextending with substantially a total combined length of said fuel bundles, and at least two of said fuel bundles being fixedly secured only at the opposite outwardly disposed end portions to said supporting member.

18. In a fuel assembly for a neutronic reactor, the combination comprising an elongated frame means having a longitudinal passageway therethrough, a plurality of elongated fuel bundles spacedly disposed in tandem relationship and slidably mounted within said frame means, an elongated supporting member coextending with substantially a total combined length of said fuel bundles, rigid means for laterally supporting one end portion of each of said fuel bundles, and only said one end portion of each of said fuel bundles being fixedly secured to said supporting member.

19. A nuclear fuel assembly comprising a supporting structure, at least two fuel bundles supported by said structure and spacedly disposed in tandem relationship, substantially rigid means for laterally supporting one end portion of each of said fuel bundles, and resilient means for laterally supporting the other end portion of each of said bundles, whereby said resilient means permits said other end portions to bend away from the hottest side of said fuel assembly upon uneven heating thereof.

References Cited

UNITED STATES PATENTS

| | | |
|---|---|---|
| 3,070,537 | 12/1962 | Treshow. |
| 3,142,627 | 7/1964 | Emerson _____ 176—78 |
| 2,841,545 | 7/1958 | Zinn _____ 176—78 X |
| 2,977,297 | 3/1961 | Evans et al. _____ 176—52 X |
| 3,128,235 | 4/1964 | Hackney et al. _____ 176—77 |
| 3,205,148 | 9/1965 | Waine et al. _____ 176—78 |

FOREIGN PATENTS 662,123 1/1958 Canada.

CARL D. QUARFORTH, *Primary Examiner.*

L. DEWAYNE RUTLEDGE, LEON D. ROSDOL,
*Examiners.*

R. L. GRUDZIECKI, *Assistant Examiner.*